(12) United States Patent
Willi

(10) Patent No.: US 9,739,192 B2
(45) Date of Patent: Aug. 22, 2017

(54) FUEL COMBUSTION SYSTEM, NOZZLE FOR PRECHAMBER ASSEMBLY WITH CURVED ORIFICES, AND METHOD OF MAKING SAME

(71) Applicant: Caterpillar Inc., Peoria, IL (US)

(72) Inventor: Martin Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 193 days.

(21) Appl. No.: 14/703,605

(22) Filed: May 4, 2015

(65) Prior Publication Data

US 2016/0326946 A1 Nov. 10, 2016

(51) Int. Cl.
| | |
|---|---|
| *F02B 19/08* | (2006.01) |
| *F02B 19/10* | (2006.01) |
| *F02B 19/12* | (2006.01) |
| *F02B 19/18* | (2006.01) |
| *F02M 21/02* | (2006.01) |
| *F02B 43/10* | (2006.01) |

(52) U.S. Cl.
CPC .............. *F02B 19/08* (2013.01); *F02B 19/10* (2013.01); *F02B 19/108* (2013.01); *F02B 19/12* (2013.01); *F02B 19/18* (2013.01); *F02M 21/0248* (2013.01); *F02B 2043/103* (2013.01)

(58) Field of Classification Search
CPC .......... F02B 19/08; F02B 19/18; F02B 19/10; F02B 19/12; F02B 19/108; F02B 2043/103; F02M 21/0248
See application file for complete search history.

(56) References Cited

U.S. PATENT DOCUMENTS

| | | | |
|---|---|---|---|
| 5,580,476 A | 12/1996 | Dam et al. | |
| 5,593,607 A | 1/1997 | Dam et al. | |
| 5,601,061 A | 2/1997 | Dam et al. | |
| 5,678,517 A * | 10/1997 | Chen ................... | F02B 19/1009 |
| | | | 123/263 |
| 5,771,857 A | 6/1998 | Willi | |
| 5,809,957 A | 9/1998 | Antone et al. | |
| 5,868,121 A | 2/1999 | Brown et al. | |
| 5,870,978 A | 2/1999 | Willi et al. | |

(Continued)

FOREIGN PATENT DOCUMENTS

| | | |
|---|---|---|
| AU | 653327 B2 | 9/1994 |
| DE | 102012022872 A1 | 5/2014 |

(Continued)

*Primary Examiner* — Joseph Dallo
(74) *Attorney, Agent, or Firm* — Leydig, Voit & Mayer, LTD.

(57) ABSTRACT

A nozzle for a prechamber assembly of an engine includes a nozzle body. The nozzle body is hollow and includes an outer surface and an inner surface. The outer surface defines an outer opening, and the inner surface defines an interior chamber and an inner opening. The nozzle body includes an orifice surface which defines an orifice passage extending between, and in communication with, the outer and inner openings. The orifice passage is in communication with the interior chamber via the inner opening. The orifice surface is continuously curved. The inner surface of the nozzle body can include a groove surface that is contiguous with the orifice surface. The groove surface defines an orifice groove in communication with the interior chamber and with the orifice passage.

14 Claims, 6 Drawing Sheets

(56) References Cited

U.S. PATENT DOCUMENTS

| | | |
|---|---|---|
| 5,947,076 A | 9/1999 | Srinivasan et al. |
| 5,975,050 A | 11/1999 | Brown et al. |
| 6,000,384 A | 12/1999 | Brown et al. |
| 6,009,860 A | 1/2000 | Brown et al. |
| 6,032,617 A | 3/2000 | Willi et al. |
| 6,044,806 A | 4/2000 | Brown et al. |
| 6,055,963 A | 5/2000 | Brown et al. |
| 6,095,102 A | 8/2000 | Willi et al. |
| 6,101,986 A | 8/2000 | Brown et al. |
| 6,158,418 A | 12/2000 | Brown et al. |
| 6,289,871 B1 | 9/2001 | Brown et al. |
| 6,386,149 B1 | 5/2002 | Coleman et al. |
| 6,575,192 B1 | 6/2003 | Shaffer |
| 6,666,185 B1 | 12/2003 | Willi et al. |
| 6,739,289 B2 | 5/2004 | Hiltner et al. |
| 7,007,669 B1 | 3/2006 | Willi et al. |
| 7,261,097 B2 | 8/2007 | Gong et al. |
| 7,343,905 B2 | 3/2008 | Willi et al. |
| 7,467,621 B2 | 12/2008 | Lauper, Jr. et al. |
| 7,654,086 B2 | 2/2010 | Gong et al. |
| 7,849,692 B2 | 12/2010 | Baldwin et al. |
| 7,905,206 B2 | 3/2011 | Willi et al. |
| 8,028,679 B2 | 10/2011 | Willi et al. |
| 8,113,173 B2 | 2/2012 | Willi et al. |
| 8,150,603 B2 | 4/2012 | Willi et al. |
| 8,783,229 B2 | 7/2014 | Kim et al. |
| 8,839,762 B1 | 9/2014 | Chiera et al. |
| 8,899,040 B2 | 12/2014 | Vijayaraghavan et al. |
| 2003/0200939 A1 | 10/2003 | Hiltner et al. |
| 2003/0221661 A1 | 12/2003 | Willi et al. |
| 2007/0000248 A1 | 1/2007 | Gong et al. |
| 2007/0000472 A1 | 1/2007 | Gong et al. |
| 2007/0234715 A1 | 10/2007 | Willi et al. |
| 2008/0022684 A1 | 1/2008 | Baldwin et al. |
| 2008/0098995 A1 | 5/2008 | Lauper et al. |
| 2008/0295501 A1 | 12/2008 | Gong et al. |
| 2009/0320814 A1 | 12/2009 | Fiveland et al. |
| 2010/0019506 A1 | 1/2010 | Gong et al. |
| 2010/0126463 A1 | 5/2010 | Willi et al. |
| 2010/0126465 A1 | 5/2010 | Willi et al. |
| 2010/0126481 A1 | 5/2010 | Willi et al. |
| 2010/0131172 A1 | 5/2010 | Willi et al. |
| 2010/0131173 A1 | 5/2010 | Willi et al. |
| 2011/0297128 A1 | 12/2011 | Kim et al. |
| 2012/0210988 A1 | 8/2012 | Willi |
| 2012/0227397 A1 | 9/2012 | Willi et al. |
| 2013/0081391 A1 | 4/2013 | Vijayaraghavan et al. |
| 2014/0026847 A1 | 1/2014 | Willi et al. |
| 2014/0032080 A1 | 1/2014 | Gehrke et al. |
| 2014/0032081 A1 | 1/2014 | Willi et al. |
| 2014/0060946 A1 | 3/2014 | Willi |
| 2014/0158088 A1 | 6/2014 | Gehrke et al. |
| 2014/0196686 A1 | 7/2014 | Coldren et al. |
| 2014/0261298 A1* | 9/2014 | Sasidharan ............ F02B 19/18 123/275 |

FOREIGN PATENT DOCUMENTS

| | | |
|---|---|---|
| FR | 2657396 A1 | 7/1991 |
| JP | 2010053751 A | 3/2010 |
| WO | WO 2014046185 A1 | 3/2014 |
| WO | WO 2014094808 A1 | 6/2014 |

* cited by examiner

FUEL COMBUSTION SYSTEM, NOZZLE FOR PRECHAMBER ASSEMBLY WITH CURVED ORIFICES, AND METHOD OF MAKING SAME

TECHNICAL FIELD

This patent disclosure relates generally to a fuel combustion system for an internal combustion engine and, more particularly, to a nozzle for a prechamber assembly for an internal combustion engine.

BACKGROUND

One type of internal combustion engines typically employs cylinders which compress a fuel and air mixture such that, upon firing of a spark plug associated with each cylinder, the compressed mixture ignites. The expanding combustion gases resulting therefrom move a piston within the cylinder. Upon reaching an end of its travel in one direction within the cylinder, the piston reverses direction to compress another volume of the fuel and air mixture. The resulting mechanical kinetic energy can be converted for use in a variety of applications, such as, propelling a vehicle or generating electricity, for example.

Another type of internal combustion engine, known as a compression ignition engine, uses a highly-compressed gas (e.g., air) to ignite a spray of fuel released into a cylinder during a compression stroke. In such an engine, the air is compressed to such a level as to achieve auto-ignition of the fuel upon contact between the air and fuel. The chemical properties of diesel fuel are particularly well suited to such auto-ignition.

The concept of auto-ignition is not limited to diesel engines, however, and has been employed in other types of internal combustion engines as well. For example, a self-igniting reciprocating internal combustion engine can be configured to compress fuel in a main combustion chamber via a reciprocating piston. In order to facilitate starting, each main combustion chamber is associated with a prechamber, particularly useful in starting cold temperature engines. Fuel is injected into not only the main combustion chamber, but also the combustion chamber of the prechamber, as well, such that, upon compression by the piston, a fuel and air mixture is compressed in both chambers. A glow plug or other type of heater is disposed within the prechamber to elevate the temperature therein sufficiently to ignite the compressed mixture. The combustion gases resulting from the ignition in the prechamber are then communicated to the main combustion chamber.

Other types of internal combustion engines use natural gas as the fuel source and include at least one piston reciprocating within a respective cylinder. A spark plug is positioned within a cylinder head associated with each cylinder and is fired on a timing circuit such that upon the piston reaching the end of its compression stroke, the spark plug is fired to thereby ignite the compressed mixture.

In still further types of internal combustion engines, prechambers are employed in conjunction with natural gas engines. Given the extremely high temperatures required for auto-ignition with natural gas and air mixtures, glow plugs or other heat sources such as those employed in typical diesel engines can be ineffective. Rather, a prechamber is associated with each cylinder of the natural gas engine and is provided with a spark plug to initiate combustion within the prechamber which can then be communicated to the main combustion chamber. Such a spark-ignited, natural gas engine prechamber is provided in, for example, the 3600 series natural gas engines commercially available from Caterpillar Inc. of Peoria, Ill.

The trend continues to operate these engines under lean-burn conditions. Lean burn refers to the burning of fuel with an excess of air in an internal combustion engine (i.e. lean fuel/air ratio). The excess of air in a lean burn engine combusts more of the fuel and emits fewer unwanted emissions. However, the lean fuel/air ratio can make it difficult to consistently achieve complete and thorough combustion within the main combustion chamber.

U.S. Pat. No. 8,839,762 is entitled, "Multi-Chamber Igniter." In the '762 patent, an air/fuel mixture is received from a combustion chamber of the internal combustion engine into an enclosure about a flame kernel initiation gap between a first ignition body and a second ignition body. The air/fuel mixture received into the enclosure is directed into a flame kernel initiation gap. The mixture is then ignited in the flame kernel initiation gap.

There is a continued need in the art to provide additional solutions to enhance the performance of components of a fuel combustion system such as those in a prechamber assembly. For example, a prechamber nozzle typically includes a configuration which causes abrupt changes in the flow of the air-fuel mixture/flame front therethrough with sharp corners along the flow path that create localized hot spots in the area of the orifices of the prechamber nozzle. The resulting high temperatures can negatively affect the prechamber assembly's allowable design parameters. As such, there is a continued need to enable a prechamber assembly of a fuel combustion system to operate so as to enhance the combustion of fuel within the system while managing the heat generated during use of the prechamber assembly to improve its durability and usefulness.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a nozzle for a prechamber assembly of an engine. The nozzle includes a nozzle body which is hollow and has an outer surface and an inner surface. The outer surface defines an outer opening, and the inner surface defines an interior chamber and an inner opening.

The nozzle body includes an orifice surface which defines an orifice passage extending between, and in communication with, the outer opening and the inner opening. The orifice passage is in communication with the interior chamber via the inner opening. The orifice surface is continuously curved.

In yet another embodiment, a fuel combustion system includes a cylinder block and a prechamber assembly. The cylinder block defines, at least partially, a main combustion chamber. The prechamber assembly is in communication with the main combustion chamber. The prechamber assembly defines a precombustion chamber which is in communication with the main combustion chamber.

The prechamber assembly includes a prechamber housing, an ignition device adapted to selectively ignite a fuel supply disposed in the precombustion chamber, and a nozzle. The ignition device is mounted to the prechamber housing. The nozzle and the prechamber housing cooperate together to define the precombustion chamber.

The nozzle includes a nozzle body. The nozzle body is hollow and includes an outer surface and an inner surface. The outer surface defines an outer opening, and the inner surface defines an interior chamber and an inner opening.

The nozzle body includes an orifice surface that defines an orifice passage extending between, and in communication with, the outer opening and the inner opening. The orifice passage is in communication with the interior chamber via the inner opening and with the main combustion chamber via the outer opening. The orifice surface is continuously curved.

In still another embodiment, a method of making a nozzle for a prechamber assembly of an engine is described. The method of making includes manufacturing a nozzle body. The nozzle body is hollow and includes an outer surface and an inner surface. The outer surface defines an outer opening, and the inner surface defines an interior chamber and an inner opening.

An orifice surface is defined in the nozzle body. The orifice surface defines an orifice passage extending between, and in communication with, the outer opening and the inner opening. The orifice passage is in communication with the interior chamber via the inner opening. The orifice surface is continuously curved.

Further and alternative aspects and features of the disclosed principles will be appreciated from the following detailed description and the accompanying drawings. As will be appreciated, the principles related to fuel combustion systems, prechamber assemblies, and methods of making nozzles for prechamber assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
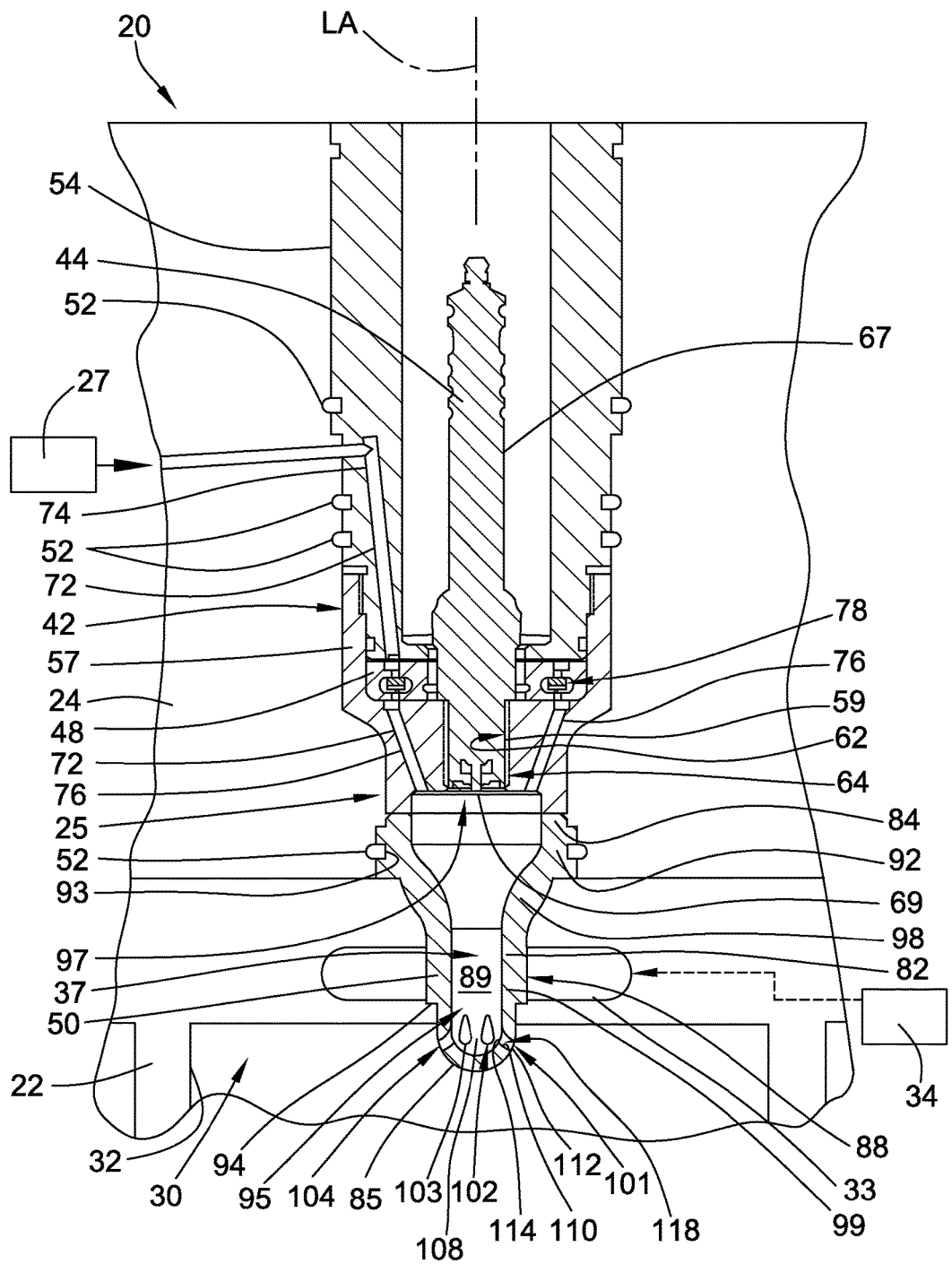
FIG. 1 is a diagrammatic, longitudinal cross-sectional view of an embodiment of a fuel combustion system constructed in accordance with principles of the present disclosure and including an embodiment of a prechamber assembly constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides embodiments of a component of a fuel combustion system of an engine and methods of making the same. In embodiments, the fuel combustion component is in the form of a nozzle of a prechamber assembly which can be mounted to at least one of a cylinder head or cylinder block of an internal combustion engine. Exemplary engines include those used in vehicles, electrical generators, and pumps, for instance.

Embodiments of a nozzle for a prechamber assembly constructed according to principles of the present disclosure can have a curved orifice configuration that helps to reduce the heat transfer between the nozzle body and a flow of an air/fuel mixture into the prechamber nozzle and/or a flame front discharging from the prechamber nozzle (also collectively referred to herein as a "fuel mixture/flame front") respectively passing through the orifices of the nozzle during intended operation of the fuel combustion system by reducing the occurrence of localized hot spots along the flow path. In embodiments, the nozzle can include an orifice surface that defines a curved orifice configured to control the flow of a fuel mixture/flame front passing through the orifice passage defined by the orifice surface to help reduce at least one of the temperature within the orifice passage and the heat transfer between the flow of a fuel mixture/flame front and the orifice surface by providing a smooth curved flow path and/or by decreasing the pressure drop of the flow of the fuel mixture/flame front passing therethrough relative to a similar orifice having an axial configuration.

In embodiments, a nozzle constructed according to principles of the present disclosure can include a nozzle body that defines at least one curved orifice having an orifice surface configured to curve toward the mounting end of the nozzle body such that a flow of a fuel mixture passing through the orifice passage into the interior chamber moves along a flow path generally along the central longitudinal axis of the nozzle body toward the mounting end. In embodiments, the nozzle body defines curved orifice passages that are configured such that the corresponding flows of a fuel mixture passing respectively therethrough into the interior chamber combine in the interior chamber to move along a flow path generally parallel with the central longitudinal axis.

In embodiments, a nozzle constructed according to principles of the present disclosure can include a nozzle body that defines curved orifices configured such that at least two separate flows of the fuel/air mixture from the combustion chamber are swirled about a central longitudinal axis upon entering the precombustion chamber. In embodiments, the curved orifices can be arranged with corresponding groove surfaces in the inner surface of the nozzle body. The curved orifices and the grooves in the interior chamber can be configured to introduce swirl characteristics in the fuel mixture conveyed into the precombustion chamber to further enhance mixing. In embodiments, the groove surfaces are configured such that flows of the fuel mixture entering the interior chamber of the nozzle body are channeled along the inner surface through grooves defined by the groove surfaces up in a helical fashion toward the ignition device to create a swirling pattern in regions radially offset from the central longitudinal axis.

In embodiments, the nozzle body can include a rounded inner opening for each of the curved orifices. The curved orifices can be configured such that the flow of fuel mixture/flame front therethrough follows a flow path with reduced abrupt changes in direction relative to an axially-extending orifice. The ignited mixture within the prechamber can be discharged through the curved orifices of the nozzle as a flow of a flame front into the main combustion chamber with reduced pressure drop as a result of the rounded inner opening of the curved orifices and sweeping flow lines through the various curved orifice configurations disclosed herein, thereby resulting in increased velocity of the flow of the flame front and enhanced flame propagation.

In embodiments, the configuration of the curved orifices can help reduce the pressure drop of the flame front exiting the interior chamber of the nozzle. The curved orifices can be configured to help reduce the stresses imposed upon the nozzle body surfaces that define the curved orifices, thereby diminishing the deleterious effects caused by the passage of the fuel mixture through the curved orifices into the interior chamber and the flame front discharged therefrom. The flame area produced by a prechamber assembly constructed according to principles of the present disclosure can help improve combustion of a lean fuel mixture in the main combustion chamber of the cylinder with which it is associated.

In embodiments, the configuration of the curved orifices of the nozzle body can be based upon computer modeling to enhance flow streamlines of the fuel mixture/flame front passing through the orifice passage. Embodiments of a nozzle constructed according to principles of the present disclosure can be made using additive manufacturing techniques.

Turning now to the FIGURES, there is shown in FIG. 1 an exemplary embodiment of a fuel combustion system 20 constructed in accordance with principles of the present disclosure. The fuel combustion system 20 can be used in any suitable internal combustion engine, such as an engine configured as part of an electrical generator or a pump, for example. The fuel combustion system 20 can be used with any suitable fuel with an appropriate fuel/air ratio. In embodiments, fuels with different ignition and burning characteristics and different specific fuel to air ratios can be used. The fuel combustion system 20 can include a cylinder block 22, a cylinder head 24, a prechamber assembly 25 having a fuel combustion component in the form of a nozzle 50 constructed in accordance with principles of the present disclosure, a supplemental fuel source 27, and a variety of other combustion devices, as will be appreciated by one skilled in the art.

Referring to FIG. 1, the cylinder block 22 defines, at least partially, a main combustion chamber 30. In embodiments, the cylinder block 22 can define a plurality of cylinders 32 (one of which is shown in FIG. 1) within which is defined the corresponding main combustion chamber 30. In embodiments, a cylinder liner can be disposed within each cylinder 32. The cylinder liner can be removably secured in the cylinder block 22.

The cylinder head 24 can be removably attached to the cylinder block 22 via suitable fasteners, such as a plurality of bolts, as will be appreciated by one skilled in the art. A gasket (not shown) can be interposed between the cylinder block 22 and the cylinder head 24 to seal the interface therebetween. The cylinder head 24 typically has bores machined for engine valves (not shown), e.g., inlet and exhaust valves, and other components of the fuel combustion system 20 (not shown), e.g., fuel injectors, glow plugs, sparks plugs, and combinations thereof, as will be appreciated by one skilled in the art.

Each cylinder 32 of the cylinder block 22 can house a reciprocally movable piston (not shown), which is coupled to a crankshaft via a suitable transfer element (e.g., a piston rod or connecting rod). The piston is reciprocally movable within the cylinder 32 for compressing and thereby pressurizing the combustible mixture in the main combustion chamber 30 during a compression phase of the engine. In embodiments, the engine can be configured to have a suitable compression ratio suited for the intended purpose of the engine, as will be understood by one skilled in the art.

In embodiments, at least one intake valve mechanism (not shown) and at least one exhaust valve mechanism (not shown) can be operatively positioned within the cylinder head 24 such that the intake valve and the exhaust valve are axially movable in the cylinder head 24. In embodiments, a mechanical valve train (e.g., including a cam, follower, and push rod mechanism) or other hydraulic and/or electric control device can be used in a conventional manner to selectively operate the intake valve mechanism and the exhaust valve mechanism. In particular, the inlet valve mechanism can be opened to admit a predetermined amount of a lean gaseous combustible mixture of fuel and air directly into the main combustion chamber 30 above the piston during an intake phase of the engine. The exhaust valve mechanism can be opened to permit the exhaust of the gases of combustion from the main combustion chamber 30 during an exhaust phase of the engine.

In embodiments, at least one of the cylinder block 22 and the cylinder head 24 defines one or more coolant passages 33. Each coolant passage 33 can be adapted to be placed in communication with a coolant fluid source 34 and configured to cool one or more components of the fuel combustion system 20. In embodiments, any suitable cooling system can be placed in fluid communication with the coolant passages 33 to circulate a coolant fluid from the coolant fluid source 34 through the coolant passages 33 in the cylinder block 22 and/or the cylinder head 24. The cylinder block 22 and the cylinder head 24 can be made from any suitable material, such as a suitable, heat-resistant metal, for example.

The prechamber assembly 25 is removably secured in the cylinder head 24 such that the prechamber assembly 25 is in communication with the main combustion chamber 30. The prechamber assembly 25 defines a precombustion chamber 37, which is in communication with the main combustion chamber 30. The prechamber assembly 25 includes a prechamber housing 42, an ignition device 44 adapted to selectively ignite fuel disposed in the precombustion chamber 37, a control valve 48, and the nozzle 50. The nozzle 50 and the prechamber housing 42 can be made from any suitable material, such as a suitable heat-resistant metal. Suitable sealing devices 52, such as o-rings, for example, can be disposed between the prechamber assembly 25 and the cylinder head 24. In other embodiments, other sealing techniques, such as, press fit, metal seals, and the like, can be used to provide a seal between the prechamber assembly 25 and the cylinder block 22 and the cylinder head 24.

The nozzle 50 and the prechamber housing 42 cooperate together to define the precombustion chamber 37 and to define a central longitudinal axis LA of the prechamber assembly 25. The nozzle 50 and the prechamber housing 42 include surfaces that are generally surfaces of revolution about the central longitudinal axis LA.

The precombustion chamber 37 has a predetermined geometric shape and volume. In embodiments, the volume of the precombustion chamber 37 is smaller than the volume of the main combustion chamber 30. In some embodiments, the volume of the precombustion chamber 37 is in a range between about one and about four percent of the total combustion chamber volume at top dead center.

The prechamber housing 42 is hollow and is adapted to receive the ignition device 44 therein. In the illustrated embodiment, the prechamber housing 42 includes an upper member 54 and a lower member 57 which are threadingly secured together. In other embodiments, other types of engagement between the upper member 54 and the lower member 57 can be used, such as, welding, press fitting, and the like.

The ignition device 44 is mounted to the prechamber housing 42. The illustrated lower member 57 of the prechamber housing 42 defines an ignition device bore 59 which has an internal threaded surface 62. The ignition device 44 has an external threaded surface 64 which is threadedly engaged with the internal threaded surface 62 of the ignition device bore 59. The ignition device bore 59 is in communication with the precombustion chamber 37.

In the illustrated embodiment, the ignition device 44 comprises a spark plug 67 with an electrode 69. The spark plug 67 is removably mounted to the prechamber housing 42 such that the electrode 69 is in communication with the precombustion chamber 37. The spark plug 67 is threadedly received in the ignition device bore 59 with the electrode 69 exposed to the precombustion chamber 37 by way of the ignition device bore 59. The spark plug 67 can be adapted to be electrically energized in a conventional manner.

In embodiments, at least one of the prechamber housing 42 and the nozzle 50 define a supplemental fuel passage 72. The supplemental fuel passage 72 is in communication with the precombustion chamber 37 and with the supplemental fuel source 27. In embodiments, the fuel of the supplemental fuel source 27 can have a richer fuel/air ratio than the fuel/air ratio of the fuel supplied directly to the main combustion chamber 30 with which the prechamber assembly 25 is associated.

In the illustrated embodiment of FIG. 1, the upper member 54 and the lower member 57 of the prechamber housing 42 both define the supplemental fuel passage 72. The illustrated upper member 54 defines a fuel passage entry segment 74. The illustrated lower member 57 of the prechamber housing 42 defines a plurality of precombustion chamber fuel passage segments 76 which are circumferentially arranged about the lower member 57 and in fluid communication with the fuel passage entry segment 74 via a control valve cavity 78 defined between the upper member 54 and the lower member 57.

The control valve 48 is disposed within the prechamber housing 42 and is adapted to selectively occlude the supplemental fuel passage 72 to prevent a flow of fuel from the supplemental fuel source 27 to the precombustion chamber 37. The illustrated control valve 48 is disposed within the control valve cavity 78 and is interposed between the fuel passage entry segment 74 and the precombustion chamber fuel passage segments 76. The control valve 48 can be adapted to selectively permit the flow of fuel from the supplemental fuel source 27 into the precombustion chamber 37 of the prechamber assembly 25 to further promote ignition within the precombustion chamber 37. The control valve 48 can be adapted to open and close with the engine's combustion cycle to prevent contamination of the fuel with exhaust and/or prevent leakage of fuel into the exhaust gases. The control valve 48 can be adapted to prevent the gas product of combustion to flow from the precombustion chamber 37 to the fuel passage entry segment 74 of the supplemental fuel passage 72 during the compression, combustion, and exhaust phases of the engine.

In embodiments, the control valve 48 can be any suitable control valve, such as a check valve assembly including a free-floating ball check having an open mode position permitting the flow of the fuel from the supplemental fuel source 27 to the precombustion chamber 37—and a closed mode position—preventing gas flow from the supplemental fuel source 27 to the precombustion chamber 37. In other embodiments, the control valve 48 can be a shuttle type check valve. In the illustrated embodiment, the control valve 48 is similar in construction and function to the check valve shown and described in U.S. Pat. No. 6,575,192.

The nozzle 50 is in communication with the main combustion chamber 30. The nozzle 50 includes a nozzle body 82 having a mounting end 84 and a distal tip 85. The nozzle body 82 defines the central longitudinal axis LA which extends between the mounting end 84 and the distal tip 85. The nozzle body 82 is hollow and includes an outer surface 88 and an inner surface 89. The outer surface 88 and the inner surface 89 are both surfaces of revolution about the central longitudinal axis LA.

The mounting end 84 of the nozzle 50 is in abutting relationship with the lower member 57 of the prechamber housing 42. The mounting end 84 of the nozzle body 82 includes an annular flange 92 that defines an external circumferential groove 93 configured to receive a suitable sealing device 52 (e.g., an o-ring) therein for sealing. Any suitable technique can be used to provide a seal between the nozzle 50 and the lower member 57 of the prechamber housing 42, such as, o-rings, press fit, metal seals, gaskets, welding, and the like.

The nozzle body 82 is positioned adjacent one of the coolant passages 33 such that coolant fluid circulating through the coolant passage 33 is in heat-transferring relationship with the nozzle body 82. The nozzle body 82 projects from the cylinder head 24 such that the distal tip 85 of the nozzle body 82 is disposed in the main combustion chamber 30 so that the distal tip 85 is in communicating relationship with the main combustion chamber 30. Any suitable sealing technique can be used to seal an interface 94 between the nozzle 50 and the cylinder block 22 and/or the cylinder head 24, such as, a gasket, a taper fit, and/or a press fit to isolate fuel, combustion gases, and engine coolant therein.

The inner surface 89 of the nozzle body 82 defines an interior chamber 95 which is open to and in communication with a distal cavity 97 defined in the lower member 57 of the prechamber housing 42. The interior chamber 95 of the nozzle body 82 and the distal cavity 97 of the lower member 57 together define the precombustion chamber 37 of the prechamber assembly 25. The interior chamber 95 of the nozzle body 82 is open to the electrode 69 of the spark plug 67 and is in fluid communication with the supplemental fuel passage 72 via the precombustion chamber fuel passage segments 76 of the lower member 57.

The mounting end 84 of the nozzle body 82 is generally cylindrical. The nozzle body 82 includes a converging portion 98 disposed adjacent the mounting end 84 and a distal cylindrical portion 99 adjacent the distal tip 85. The distal cylindrical portion 99 has a smaller diameter than that of the mounting end 84.

Figure 2:
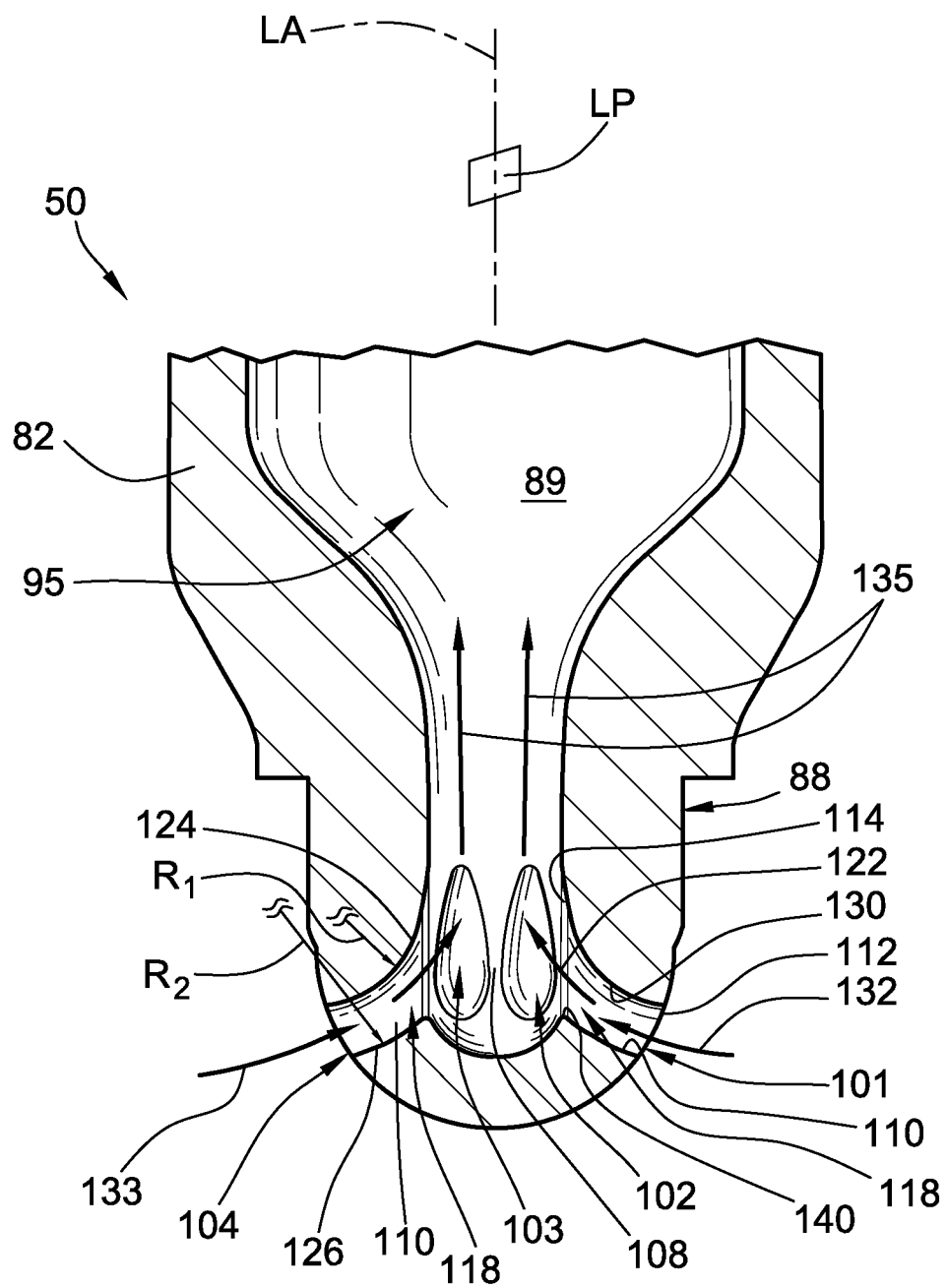
FIG. 2 is an enlarged, fragmentary view of an embodiment of a prechamber nozzle constructed in accordance with principles of the present disclosure, the prechamber nozzle being suitable for use in embodiments of a prechamber assembly following principles of the present disclosure.

Referring to FIGS. 1 and 2, the nozzle body 82 defines a plurality of curved orifices 101, 102, 103, 104 in the distal tip 85. The curved orifices 101, 102, 103, 104 are in communication with the interior chamber 95 of the nozzle body 82 and with the main combustion chamber 30 when the prechamber assembly 25 is installed in the cylinder head 24. The nozzle body 82 includes an orifice bridge 108 defined circumferentially between the curved orifices 101, 102, 103, 104.

In embodiments, the nozzle 50 can include a nozzle body 82 that defines any suitable number of orifices to achieve the desired flow characteristics within the interior chamber 95 of the nozzle body 82 and the desired flame discharge pattern in the main combustion chamber 30 resulting from the combustion phase in the nozzle 50. For example, in the illustrated embodiment, the nozzle body 82 includes six curved orifices (four of which are shown in FIG. 1 with the other two being mirror images of the second and third curved orifices 102, 103, respectively). The six curved orifices are circumferentially arranged about the central longitudinal axis LA at substantially evenly-spaced angular positions (about sixty degrees apart from each other). The curved orifices 101, 102, 103, 104 are axially aligned along the central longitudinal axis LA.

In other embodiments, the nozzle body 82 can define a different number of orifices, such as eight or twelve orifices circumferentially arranged about the central longitudinal axis LA at substantially evenly-spaced angular positions (about forty-five degrees and about thirty degrees apart from each other, respectively). In still other embodiments, the nozzle body 82 can define yet a different number of curved orifices. In other embodiments, the nozzle body 82 can define curved orifices that have variable spacing between at least two pairs of adjacent curved orifices and/or be axially offset from at least one other curved orifice along the central longitudinal axis LA.

Referring to FIGS. 1 and 2, the illustrated curved orifices 101, 102, 103, 104 are substantially identical to each other. Accordingly, it will be understood that the description of one orifice is applicable to the other orifices, as well. The first curved orifice 101 includes an orifice surface 110 that defines the curved orifice 101. In embodiments, each of the curved orifices 101, 102, 103, 104 has a configuration that helps to reduce the heat transfer between the nozzle body 82 and a flow of a fuel mixture/flame front respectively passing through the curved orifices 101, 102, 103, 104 and/or reduce the temperature within the curved orifices 101, 102, 103, 104 in such a way as to reduce the occurrence of localized hot spots.

With respect to the first curved orifice 101, the outer surface 88 defines an outer opening 112, and the inner surface 89 defines an inner opening 114. The orifice surface 110 defines an orifice passage 118 extending between, and in communication with, the outer opening 112 and the inner opening 114. The orifice passage 118 is in communication with the interior chamber 95 via the inner opening 114. The other curved orifices 102, 103, 104 of the nozzle body 82 are similarly configured.

In embodiments, the orifice surface 110 is continuously curved. In the illustrated embodiment, the orifice surface 110 is continuously curved from the outer opening 112 to the inner opening 114. In the illustrated embodiment, the orifice surface 110 comprises a curved cylindrical segment. In embodiments, the orifice surface 110 can be configured to curve toward the mounting end 84 of the nozzle body 82 (see also FIG. 1) such that a flow of a fuel mixture passing through the orifice passage 118 into the interior chamber 95 moves along a flow path 122 generally along the central longitudinal axis LA toward the mounting end 84 of the nozzle body 82.

As shown in FIG. 2, the illustrated nozzle 50 includes curved orifices 101, 102, 103, 104 each with a tear-drop shaped inner opening 114. Referring to the fourth curved orifice 104 in FIG. 2, the orifice surface 110 is in the form of a curved cylindrical segment having a proximal portion 124 and a distal portion 126. The proximal portion 124 is closer to the mounting end 84 than is the distal portion 126. At the inner opening 114, the proximal portion 124 has a transverse orifice area in a plane perpendicular to the flow of a fuel mixture/flame front therethrough that is narrower than the transverse orifice area of the distal portion 126.

In embodiments, the curved orifices 101, 102, 103, 104 can each include an intermediate region 130 which is constricted relative to the inner opening 114. In the illustrated embodiment, the inner opening 114 has a transverse orifice area in a plane perpendicular to the flow of a fuel mixture/flame front therethrough. The orifice surface 110 includes an intermediate region 130 disposed between the inner opening 114 and the outer opening 112. The intermediate region 130 has a transverse orifice area which is smaller than the transverse orifice area of the inner opening 114. In the illustrated embodiment, the intermediate region 130 is disposed radially between the inner opening 114 and the outer opening 112.

As shown in FIG. 2, the curved orifices 101, 102, 103, 104 are respectively circumferentially disposed about the central longitudinal axis LA such that the curved orifices 101, 102, 103, 104 have the same relative inclined position with respect to the central longitudinal axis LA. In embodiments, the curved orifices 101, 102, 103, 104 can extend along a different angle of inclination, defined between the center points of the outer opening 112 and the inner opening 114 of the respective curved orifice 101, 102, 103, 104, relative to the central longitudinal axis LA. In still other embodiments, at least one of the curved orifices 101, 102, 103, 104 can extend along an angle of inclination relative to the central longitudinal axis LA that is different from at least one other of the curved orifices 101, 102, 103, 104.

The orifice surfaces 110 of the first and fourth curved orifices 101, 104 are disposed along a longitudinal plane LP extending through the central longitudinal axis LA. The cross-section view of the nozzle body 82 shown in FIG. 2 is taken along the longitudinal plane LP. In the illustrated embodiment, the first and fourth curved orifices 101, 104 are mirror images of each other about the central longitudinal axis LA.

The proximal portion 124 of the orifice surface 110 in the form of a curved cylindrical segment has a first radius $R_1$ of curvature, and the distal portion 126 of the orifice surface 110 has a second radius $R_2$ of curvature in the longitudinal plane LP of FIG. 2. In the illustrated embodiment, the first radius of curvature $R_1$ is smaller than the second radius $R_2$ of curvature such that the proximal portion 124 is more curved than the distal portion 126.

The orifice passages 118 of the first and fourth curved orifices 101, 104 are disposed in opposing relationship to each other along the longitudinal plane LP extending through the central longitudinal axis LA such that the central longitudinal axis LA is disposed between the orifice passage 118 of the first curved orifice 101 and the orifice passage 118 of the fourth curved orifice 104 along the longitudinal plane LP. The orifice passage 118 of the first curved orifice 101 and the fourth curved orifice 104 are both configured such that flows 132, 133 of a fuel mixture passing respectively therethrough into the interior chamber 95 combine in the interior chamber 95 to move along a combined flow path 135 generally parallel with the central longitudinal axis LA. The second and third curved orifices 102, 103 are respectively arranged in a similar manner with the other two curved orifices of the nozzle body 82 along two other longitudinal planes that extend through the central longitudinal axis LA and that are disposed circumferentially about sixty degrees apart with respect to each other about the central longitudinal axis LA.

The curved orifices 101, 102, 103, 104 can be configured such that flows of burning fuel respectively conveyed from the interior chamber 95 out through the curved orifices 101, 102, 103, 104 are controllably directed away from the nozzle body 82 in diverging relationship to each other, controllably expanding the burning gases away from the distal tip 85 of the nozzle 50 into the main combustion chamber 30 in order to facilitate the ignition and burning of the combustible mixture in the main combustion chamber 30 over a larger volume at the same time. In embodiments, the configuration of the curved orifices 101, 102, 103, 104 can help reduce the pressure drop of the flame front exiting the interior chamber 95 of the nozzle 50.

In embodiments, the inner opening 114 of each curved orifice 101, 102, 103, 104 of the nozzle body 82 can be rounded. Each rounded inner opening 114 can be defined by a curved fillet surface 140. In the illustrated embodiment, the curved fillet surface 140 is convex. The ignited mixture within the interior chamber 95 of the nozzle 50 can be discharged through the curved orifices 101, 102, 103, 104 of the nozzle body 82 as a respective flow of a flame front into the main combustion chamber with reduced heat transfer effects that cause localized hot spots as a result of the inner opening 114 being rounded and the orifice surface 110 being continuously curved. The configuration of the curved orifices 101, 102, 103, 104 can help reduce the stresses imposed upon the orifice surfaces 110 of the nozzle body 82, thereby diminishing the deleterious effects caused by the passage of the flame front discharged therefrom.

Figure 3:
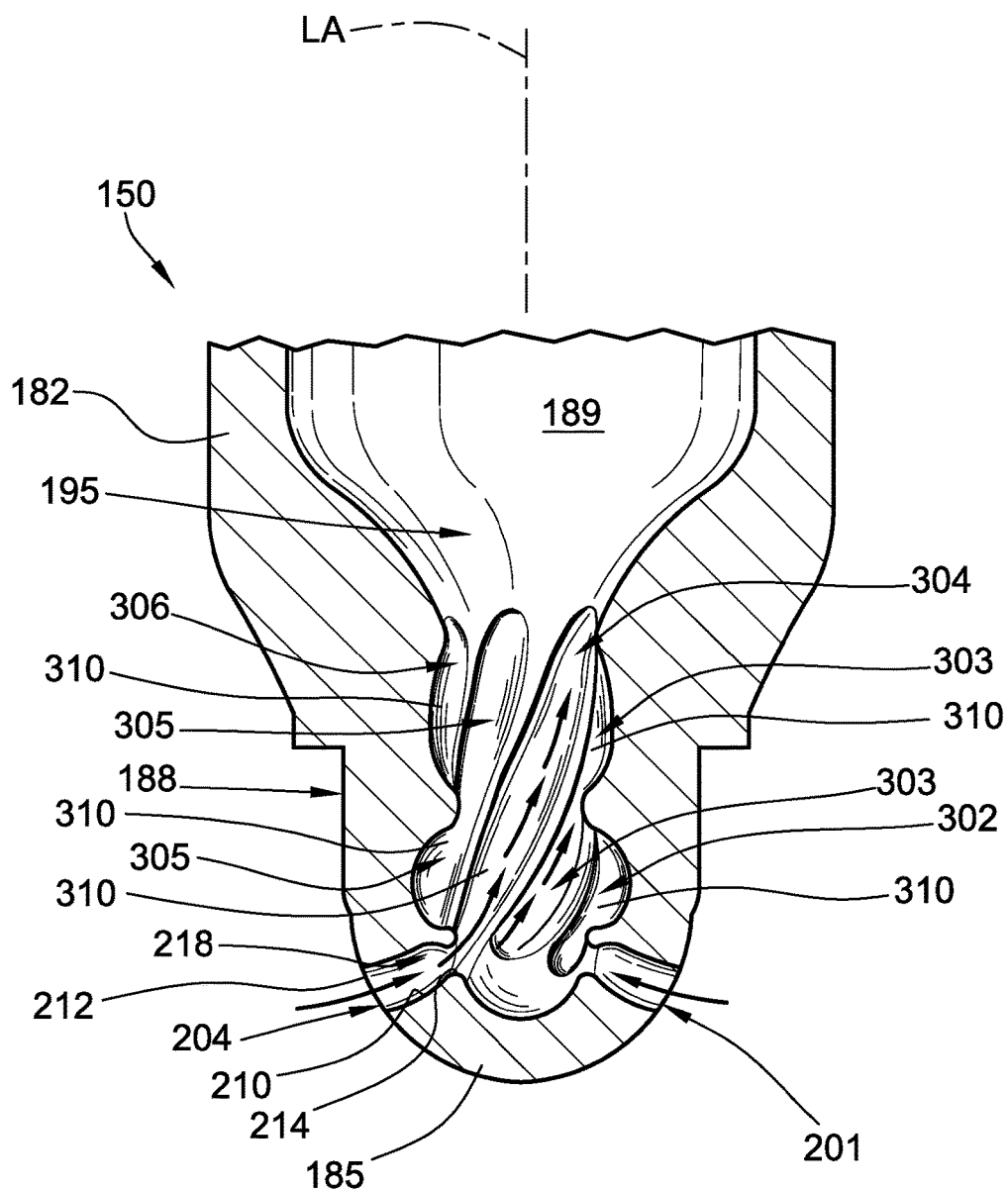
FIG. 3 is a diagrammatic, longitudinal cross-sectional view of another embodiment of a prechamber nozzle constructed in accordance with principles of the present disclosure, the prechamber nozzle being suitable for use in embodiments of a fuel combustion system having a prechamber assembly following principles of the present disclosure.
Figure 4:
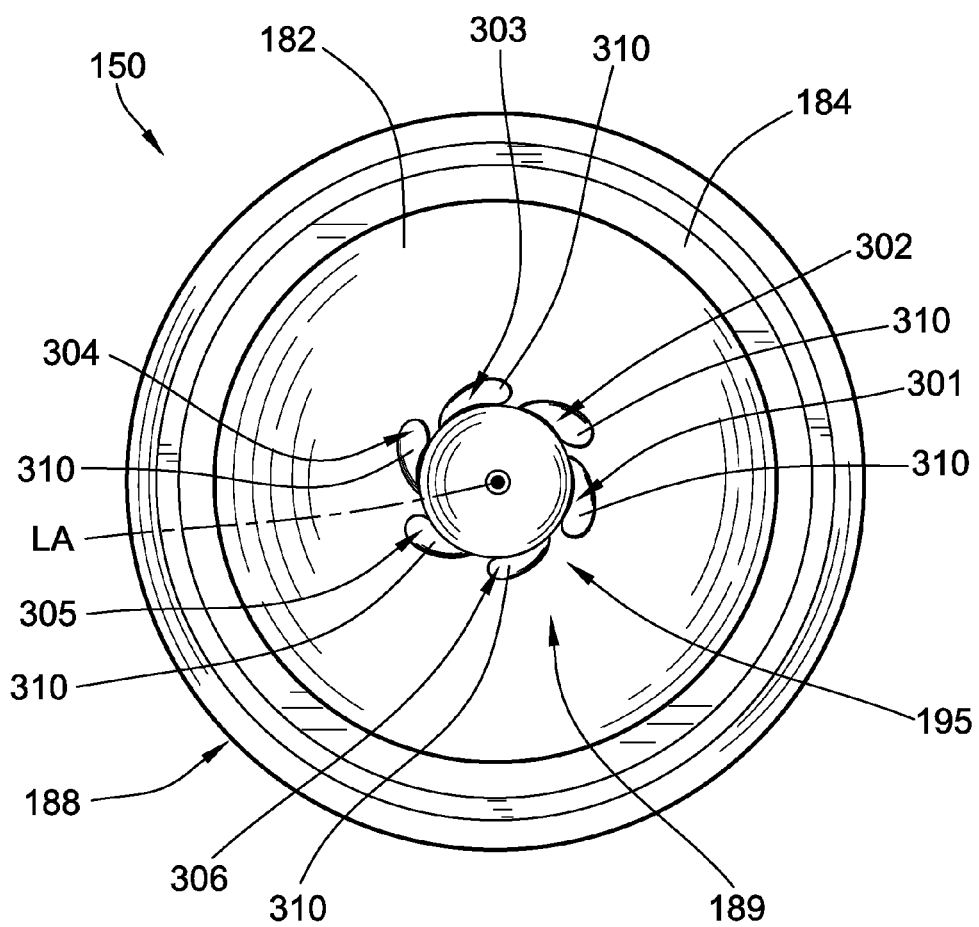
FIG. 4 is a top plan view of the prechamber nozzle of FIG. 3.
Figure 5:
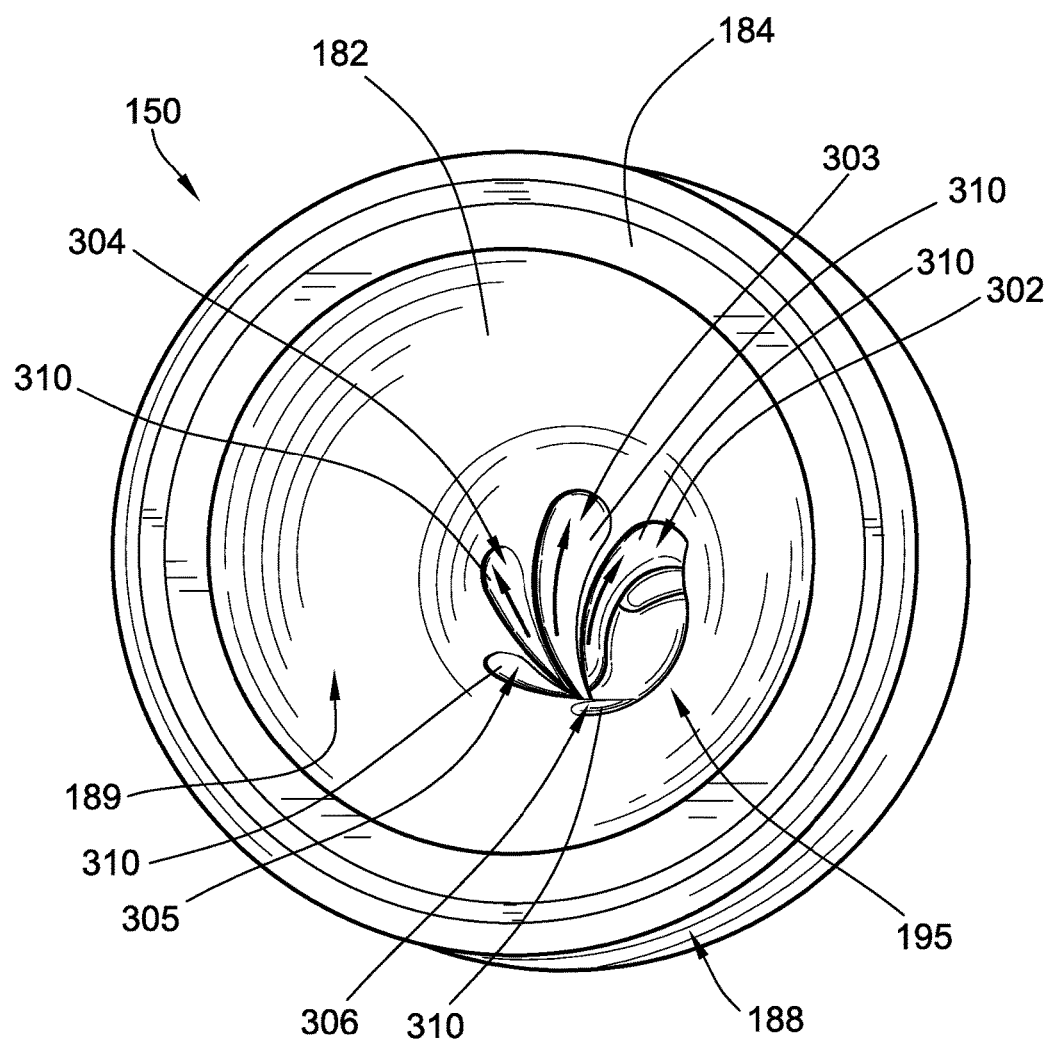
FIG. 5 is a top perspective view of the prechamber nozzle of FIG. 3.

Referring to FIGS. 3-5, another embodiment of a fuel combustion component in the form of a nozzle 150 constructed in accordance with principles of the present disclosure is shown. The nozzle 150 is suitable for use in a fuel combustion system constructed in accordance with principles of the present disclosure, such as the fuel combustion system 20 of FIG. 1.

The nozzle 150 includes a nozzle body 182 having a mounting end 184 and a distal tip 185. The nozzle body 182 defines the central longitudinal axis LA which extends between the mounting end 184 and the distal tip 185. The nozzle body 182 is hollow and includes an outer surface 188 and an inner surface 189. The outer surface 188 and the inner surface 189 are both surfaces of revolution about the central longitudinal axis LA. The inner surface 189 of the nozzle body 182 defines an interior chamber 195.

Referring to FIG. 3, the nozzle body 182 defines a plurality of curved orifices 201, 204 in the distal tip 185. The curved orifices 201, 204 are in communication with the interior chamber 195 of the nozzle body 182 and with the main combustion chamber 30 when the nozzle 150 is installed in the cylinder head 24.

In the illustrated embodiment, the nozzle body 182 includes six curved orifices 201, 204 which are circumferentially arranged about the central longitudinal axis LA at substantially evenly-spaced angular positions (about sixty degrees apart from each other). The illustrated curved orifices 201, 204 are substantially identical to each other. In embodiments, each of the curved orifices 201, 204 has a configuration that helps to reduce the heat transfer between the nozzle body 182 and a flow of a fuel mixture/flame front respectively passing through the curved orifices 201, 204 and/or reduce the temperature within the curved orifices 201, 204 in such a way as to inhibit the occurrence of localized hot spots.

The fourth curved orifice 204 includes an orifice surface 210 that defines the curved orifice 204. The outer surface 188 defines an outer opening 212, and the inner surface 189 defines an inner opening 214. The orifice surface 210 defines an orifice passage 218 extending between, and in communication with, the outer opening 212 and the inner opening 214. The orifice passage 218 is in communication with the interior chamber 195 via the inner opening 214. The other curved orifices 201 of the nozzle body 182 are similarly configured.

In embodiments, the orifice surface 210 is continuously curved. In the illustrated embodiment, the orifice surface 210 is continuously curved from the outer opening 212 to the inner opening 214. In embodiments, the orifice surface 210 extends circumferentially about the central longitudinal axis LA between the outer opening 212 and the inner opening 214. In embodiments, the outer opening 212 has a first circumferential position (or azimuth position) about the central longitudinal axis LA and the inner opening 214 has a second circumferential position (or azimuth position) which is different from the first circumferential position such that the inner opening 214 is circumferentially offset with respect to the outer opening 212. In embodiments, the orifice surface 210 is continuously curved in a helical fashion.

Referring to FIGS. 3-5, the inner surface 189 of the nozzle body 182 defines a plurality of orifice grooves 301, 302, 303, 304, 305, 306 respectively associated with each curved orifice 201, 204 of the nozzle body 182. Accordingly, in the illustrated embodiment, there are six orifice grooves 301, 302, 303, 304, 305, 306 respectively associated with six curved orifices 201, 204 (two of which are shown in FIG. 3). The orifice grooves 301, 302, 303, 304, 305, 306 are each in communication with the interior chamber 195 and with the orifice passage 218 of the curved orifice with which it is associated. The inner surface 189 groove surfaces 310 that define each orifice groove 301, 302, 303, 304, 305, 306. Each groove surface 310 projects radially outwardly away from the central longitudinal axis LA and is contiguous with the orifice surface 210 of the curved orifice with which it is associated.

The curved orifices 201, 204 and the orifice grooves 301, 302, 303, 304, 305, 306 defined by the groove surfaces 310 in the inner surface 189 can be configured to introduce swirl characteristics in the fuel mixture conveyed into the interior chamber 195 to further enhance mixing. In embodiments, the groove surfaces 310 are configured such that flows of the fuel mixture entering the interior chamber 195 of the nozzle body 182 are channeled along the inner surface 189 through the orifice grooves 301, 302, 303, 304, 305, 306 defined by the groove surfaces 310 up in a helical fashion toward the ignition device 44 to create a swirling pattern in regions radially offset from the central longitudinal axis LA.

The illustrated groove surfaces 310 are substantially identical. Each of the illustrated groove surfaces 310 is generally helical, extending axially along the central longitudinal axis LA and circumferentially about the central longitudinal axis LA. In other embodiments, at least one of the groove surfaces 310 can have a configuration that is different from at least one other of the groove surfaces 310 of the inner surface 189 of the nozzle body 182. The nozzle 150 of FIGS. 3-5 can be similar in other respects to the nozzle 50 of FIGS. 1 and 2.

It will be apparent to one skilled in the art that various aspects of the disclosed principles relating to fuel combustion systems and fuel combustion components can be used with a variety of engines. Accordingly, one skilled in the art will understand that, in other embodiments, an engine following principles of the present disclosure can include different fuel combustion components constructed according to principles of the present disclosure and can take on different forms.

Figure 6:
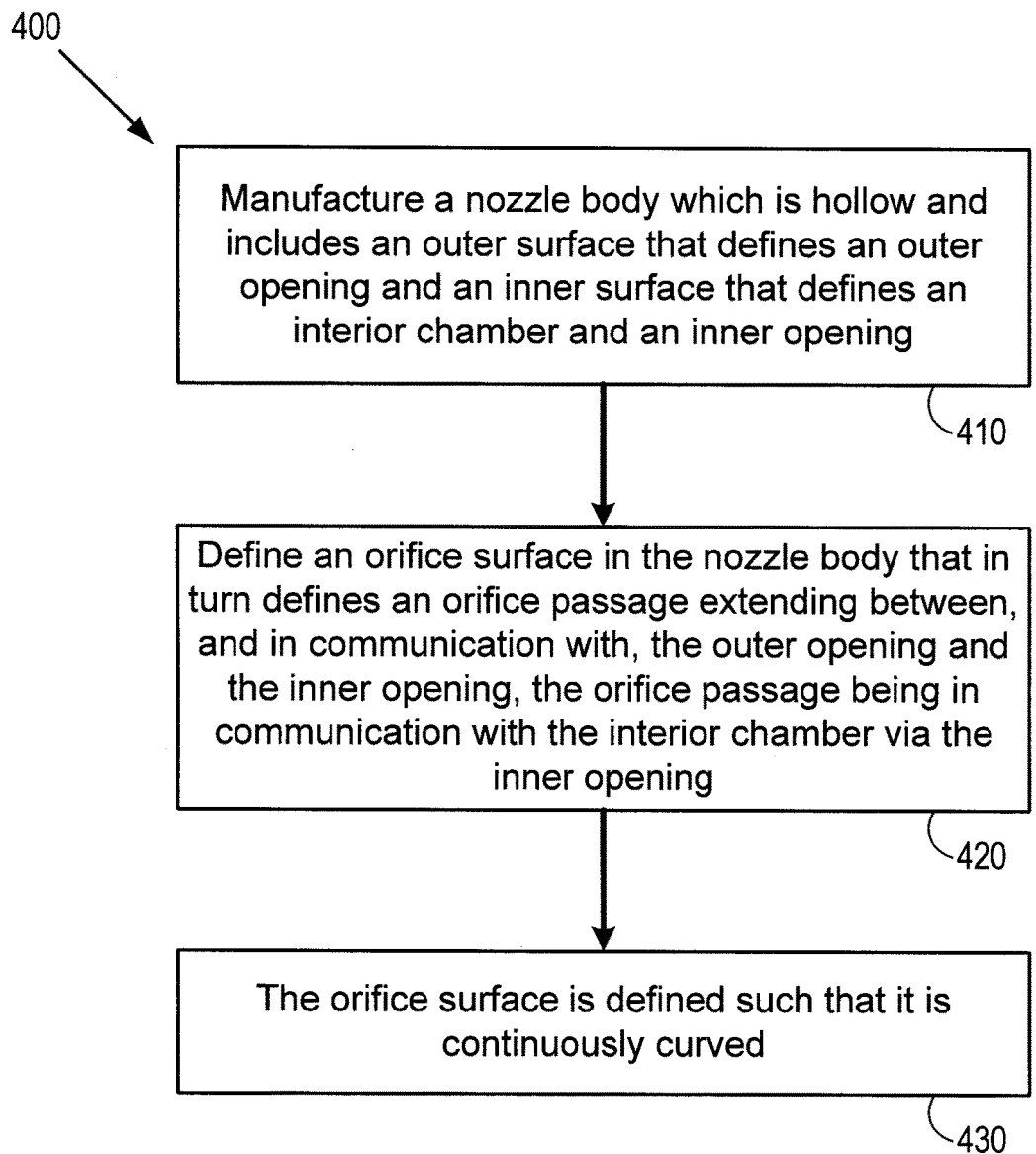
FIG. 6 is a flowchart illustrating steps of an embodiment of a method of making a nozzle for a prechamber assembly of an engine following principles of the present disclosure.

Referring to FIG. 6, steps of an embodiment of a method 400 of making a nozzle for a prechamber assembly of an engine following principles of the present disclosure are shown. The method of making includes manufacturing a nozzle body with a continuously curved orifice. In embodiments, a method of making a nozzle for a prechamber assembly of an engine following principles of the present disclosure can be used to make any embodiment of a nozzle for a prechamber assembly according to principles of the present disclosure. In other embodiments, the nozzle body can be any suitable nozzle body for use in a fuel combustion system.

The illustrated method 400 of making a nozzle for a prechamber assembly includes manufacturing a nozzle body (step 410). The nozzle body is hollow and includes an outer surface and an inner surface. The outer surface defines an outer opening, and the inner surface defines an interior chamber and an inner opening. In embodiments, the body is manufactured from a suitable material, such as a metal alloy. In embodiments, the body is made from at least one of a nickel alloy and a steel.

An orifice surface is defined in the nozzle body (step 420). The orifice surface defines an orifice passage extending between, and in communication with, the outer opening and the inner opening. The orifice passage is in communication with the interior chamber via the inner opening. The orifice surface is defined such that it is continuously curved (step 430).

In embodiments of a method of making a nozzle for a prechamber assembly following principles of the present disclosure, the nozzle body and the orifice surface is defined via additive manufacturing (also sometimes referred to as "additive layer manufacturing" or "3D printing"). In embodiments, any suitable additive manufacturing equipment can be used. For example, in embodiments, a production 3D printer commercially available under the under the brand name ProX™ 200 from 3D Systems, Inc. of Rock Hill, S.C., can be used. In embodiments of a method of making a nozzle for a prechamber assembly following principles of the present disclosure, the nozzle body and each orifice surface are manufactured together via additive manufacturing, and each orifice passage is defined within the nozzle body substantially simultaneously with its manufacture.

In embodiments of a method of making a nozzle for a prechamber assembly following principles of the present disclosure, the nozzle body includes a mounting end and a distal tip. The nozzle body defines a central longitudinal axis extending between the mounting end and the distal tip. The orifice surface comprises a curved cylindrical segment. The orifice surface is disposed along a longitudinal plane extending through the central longitudinal axis.

In embodiments, the orifice surface is disposed along a longitudinal plane extending through the central longitudinal axis. In embodiments, the orifice surface is configured to curve toward the mounting end of the nozzle body such that a flow of a fuel mixture passing through the orifice passage into the interior chamber moves along a flow path generally along the central longitudinal axis toward the mounting end.

In embodiments, a plurality of curved orifices is defined in the nozzle body. At least a pair of curved orifices can be disposed in opposing relationship to each other along a longitudinal plane extending through the central longitudinal axis such that the central longitudinal axis is disposed between the first orifice passage and the second orifice passage along the longitudinal plane.

In other embodiments of a method of making a nozzle for a prechamber assembly following principles of the present disclosure, the orifice surface is defined such that the orifice surface extends circumferentially about the central longitudinal axis. In embodiments, a plurality of curved orifices is defined in the nozzle body which each extends circumferentially about the central longitudinal axis.

In embodiments of a method of making a nozzle for a prechamber assembly following principles of the present disclosure, the nozzle body is manufactured such that the inner surface includes a groove surface. The groove surface projects radially outwardly away from the central longitudinal axis and is contiguous with the orifice surface. The groove surface defines an orifice groove in communication with the interior chamber and with the orifice passage. In at least some of such embodiments, the groove surface is generally helical, extending axially along the central longitudinal axis and circumferentially about the central longitudinal axis.

In embodiments of a method of making a nozzle for a prechamber assembly following principles of the present disclosure, the nozzle body includes a plurality of curved orifice surfaces. The plurality of curved orifice surfaces is circumferentially arranged about the central longitudinal axis. The plurality of curved orifice surfaces defines a corresponding plurality of orifice passages extending between, and in communication with, a corresponding plurality of outer openings and inner openings defined by the outer surface and the inner surface, respectively. The inner surface of the nozzle body includes a plurality of groove surfaces that is respectively contiguous with the plurality of orifice surfaces. The plurality of groove surfaces defines a plurality of orifice grooves in communication with the interior chamber. The plurality of orifice grooves also is respectively in communication with the plurality of orifice passages.

INDUSTRIAL APPLICABILITY

The industrial applicability of the embodiments of a fuel combustion system, a nozzle for a prechamber assembly, and a method of making the same as described herein will be readily appreciated from the foregoing discussion. At least one embodiment of a prechamber assembly constructed according to principles of the present disclosure can be used in an engine to help operate the engine with a lean fuel/air ratio. Embodiments of a nozzle and/or a prechamber assembly according to principles of the present disclosure may find potential application in any suitable engine. Exemplary engines include those used in electrical generators and pumps, for instance.

For example, in some internal combustion engines, the energy of an ignition spark may not be sufficient to ignite reliably the combustion gas/air mixture, which for emissions reasons is often very lean, in the main combustion chamber. To increase the ignition energy, a prechamber assembly constructed according to principles of the present disclosure can be connected to the cylinder head and placed in communication with the main combustion chamber via a plurality of continuously curved orifices defined in the nozzle. A small part of the mixture is enriched with a small quantity of combustion gas or an additional fuel and ignited in the precombustion chamber.

In embodiments, a prechamber assembly including a nozzle constructed according to principles of the present disclosure can be associated with a supplemental fuel source adapted to direct a flow of fuel into the precombustion chamber of the prechamber assembly through a path other than via the main combustion chamber in the cylinder block with which the prechamber assembly is associated. In such embodiments, a control valve, such as a conventional check valve arrangement, can be provided to selectively permit the flow of fuel from the supplemental fuel source into the precombustion chamber of the prechamber assembly to further promote ignition within the precombustion chamber. In embodiments, the fuel of the supplemental fuel source can have a richer fuel/air ratio than the fuel/air ratio of the fuel supplied directly to the main combustion chamber with which the prechamber assembly is associated.

Embodiments of a prechamber assembly constructed according to principles of the present disclosure can help enhance mixing within the precombustion chamber so that leaner mixtures can be used for $NO_x$ control for improved engine efficiency. In embodiments, a nozzle constructed according to principles of the present disclosure can define curved orifices configured such that at least two separate flows of the fuel/air mixture from the combustion chamber are swirled about a central longitudinal axis upon entering the precombustion chamber. The curved orifices can be arranged with corresponding groove surfaces in the inner surface such that flows of the fuel/air mixture are channeled along the inner surface through grooves defined by the groove surfaces up in a helical fashion toward the ignition device to create a swirling pattern in regions radially offset from the central longitudinal axis. The curved orifices leading to, and the orifice grooves within, the interior chamber can be configured to introduce swirl characteristics in the fuel mixture conveyed into the precombustion chamber to further enhance mixing. A robust flame jet can be developed in the interior chamber as a result of the enhanced turbulence in the interior chamber of the nozzle body.

Embodiments of a nozzle constructed according to principles of the present disclosure can have an orifice configuration that provides a more robust combustion of the fuel mixture within the interior cavity of the nozzle. The orifice configuration of a nozzle constructed according to principles of the present disclosure can decrease the pressure drop of the flow of the flame front therethrough to provide enhanced flame propagation with increased velocity. The curved orifices can be configured to help reduce the stresses imposed upon the nozzle body surfaces that define the curved orifices, thereby diminishing the deleterious effects caused by the passage of the fuel/air mixture through the curved orifices and the flame discharge therefrom. Embodiments of a fuel combustion component constructed according to principles of the present disclosure can be made using additive manufacturing techniques.

Flame propagation, i.e. ignition kernel, is transferred to the main combustion chamber by way of the continuously curved orifices in the nozzle and the flame propagation ignites the lean fuel mixture. The flame discharge pattern from the curved orifices can spread the flame pattern outwardly such that the flame area in the main combustion chamber is increased. The discharge flame pattern emitting from the nozzle is advantageous because it has a hot surface area that can ignite even extremely lean or diluted combustible mixtures in a repeatable manner.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A nozzle for a prechamber assembly of an engine, the nozzle comprising:
    a nozzle body, the nozzle body being hollow and including an outer surface and an inner surface, the outer surface defining an outer opening, and the inner surface defining an interior chamber and an inner opening;
    wherein the nozzle body includes an orifice surface, the orifice surface defining an orifice passage extending between, and in communication with, the outer opening and the inner opening, the orifice passage being in communication with the interior chamber via the inner opening, and wherein the orifice surface is continuously curved;
    wherein the inner opening has a first transverse orifice area, and the orifice surface includes an intermediate region disposed between the inner opening and the outer opening, the intermediate region having a second transverse orifice area, the second transverse orifice area being smaller than the first transverse orifice area.

2. The nozzle according to claim 1, wherein the nozzle body includes a mounting end and a distal tip, the nozzle body defining a central longitudinal axis extending between the mounting end and the distal tip, and wherein the orifice surface comprises a curved cylindrical segment, the orifice surface being disposed along a longitudinal plane extending through the central longitudinal axis.

3. The nozzle according to claim 2, wherein the curved cylindrical segment has a proximal portion and a distal portion, the proximal portion being closer to the mounting end than is the distal portion, the proximal portion of the curved cylindrical segment having a first radius of curvature and the distal portion of the curved cylindrical segment having a second radius of curvature, and the first radius of curvature being smaller than the second radius of curvature such that the proximal portion is more curved than the distal portion.

4. The nozzle according to claim 2, wherein the inner opening, the outer opening, the orifice surface, and the orifice passage respectively comprise a first inner opening, a first outer opening, a first orifice surface, and a first orifice passage, the outer surface defines a second outer opening, the inner surface defines a second inner opening, and the nozzle body includes a second orifice surface, the second orifice surface defining a second orifice passage extending between, and in communication with, the second outer opening and the second inner opening, the second orifice passage being in communication with the interior chamber via the second inner opening, the second orifice surface being continuously curved, the second orifice passage being disposed in opposing relationship to the first orifice passage along the longitudinal plane extending through the central longitudinal axis such that the central longitudinal axis is disposed between the first orifice passage and the second orifice passage along the longitudinal plane.

5. The nozzle according to claim 4, wherein the first orifice passage and the second orifice passage are configured such that first and second flows of a fuel mixture passing respectively therethrough into the interior chamber combine in the interior chamber to move along a flow path generally parallel with the central longitudinal axis.

6. The nozzle according to claim 1, wherein the nozzle body includes a mounting end and a distal tip, the nozzle body defining a central longitudinal axis extending between the mounting end and the distal tip, and the orifice surface extends circumferentially about the longitudinal axis.

7. A nozzle for a prechamber assembly of an engine, the nozzle comprising:
a nozzle body, the nozzle body being hollow and including an outer surface and an inner surface, the outer surface defining an outer opening, and the inner surface defining an interior chamber and an inner opening;
wherein the nozzle body includes an orifice surface, the orifice surface defining an orifice passage extending between, and in communication with, the outer opening and the inner opening, the orifice passage being in communication with the interior chamber via the inner opening, and wherein the orifice surface is continuously curved; wherein the nozzle body includes a mounting end and a distal tip, the nozzle body defining a central longitudinal axis extending between the mounting end and the distal tip, and the inner surface of the nozzle body includes a groove surface, the groove surface projecting radially outwardly away from the central longitudinal axis and being contiguous with the orifice surface, the groove surface defining an orifice groove in communication with the interior chamber and with the orifice passage.

8. The nozzle according to claim 7, wherein the orifice surface extends circumferentially about the central longitudinal axis.

9. The nozzle according to claim 7, wherein the groove surface is generally helical, extending axially along the central longitudinal axis and circumferentially about the central longitudinal axis.

10. The nozzle according to claim 9, wherein the orifice surface extends circumferentially about the central longitudinal axis.

11. A nozzle for a prechamber assembly of an engine, the nozzle comprising:
a nozzle body, the nozzle body being hollow and including an outer surface and an inner surface, the outer surface defining an outer opening, and the inner surface defining an interior chamber and an inner opening;
wherein the nozzle body includes an orifice surface, the orifice surface defining an orifice passage extending between, and in communication with, the outer opening and the inner opening, the orifice passage being in communication with the interior chamber via the inner opening, and wherein the orifice surface is continuously curved; wherein the nozzle body includes a mounting end and a distal tip, the nozzle body defining a central longitudinal axis extending between the mounting end and the distal tip, and the nozzle body includes a plurality of curved orifice surfaces, the plurality of curved orifice surfaces being circumferentially arranged about the central longitudinal axis, the plurality of curved orifice surfaces correspondingly defining a plurality of orifice passages extending between, and in communication with, a corresponding plurality of outer openings and inner openings defined by the outer surface and the inner surface, respectively, and wherein the inner surface of the nozzle body includes a plurality of groove surfaces, the plurality of groove surfaces being respectively contiguous with the plurality of curved orifice surfaces, the plurality of groove surfaces correspondingly defining a plurality of orifice grooves in communication with the interior chamber, and the plurality of orifice grooves respectively in communication with the plurality of orifice passages.

12. The nozzle according to claim 11, wherein the orifice surface extends circumferentially about the central longitudinal axis.

13. The nozzle according to claim 11, wherein the plurality of groove surfaces are generally helical, extending axially along the central longitudinal axis and circumferentially about the central longitudinal axis.

14. The nozzle according to claim 13, wherein the plurality of orifice surfaces extend circumferentially about the central longitudinal axis.

* * * * *